Feb. 12, 1952     A. D. HASLEY ET AL     2,585,772

METHOD AND CIRCUIT FOR PULSATION WELDING

Filed June 18, 1949

INVENTORS A. D. HASLEY
            F. H. HIBBARD
BY

ATTORNEY

Patented Feb. 12, 1952

2,585,772

UNITED STATES PATENT OFFICE 2,585,772

METHOD AND CIRCUIT FOR PULSATION WELDING

Andrew D. Hasley, Basking Ridge, and Frank H. Hibbard, Mountain Lakes, N. J., assignors to Bell Telephone Laboratories, Incorporated, New York, N. Y., a corporation of New York Application June 18, 1949, Serial No. 99,896

5 Claims. (Cl. 219—10)

This invention relates to electrical welding and more particularly to a method and circuit for pulsation welding.

In order to obtain reliable electrical welding, three requirements must be met. First, the initial voltage applied to the weld must be high enough to break down any initial contact resistance and to permit the flow of an adequate heating current. Second, the flow rate of energy to the weld must be adequate to melt the metals and yet not of such energy that the total energy in any instance rises to a destructive level. And third, there must be a complete or adequate reduction in energy flow upon completion of the weld to prevent the weld reaching a destructive temperature level after the metal has been melted.

In the welding of small objects, difficulty is encountered in meeting these requirements and particularly in controlling the heat applied to the weld to prevent the overheating and destruction of the object being welded. Various timing circuits have been proposed but results with these are always dependent on the accuracy of prediction in presetting the timing means. Similarly, in various other operations the size of the single pulse has been predetermined, depending on the metals being welded, the thickness of the metals, etc. These methods, however, are not dependent in any way on the individual weld itself for the determination of the controls and, therefore, fail to take into account the various differences and peculiarities of each weld. They thus cause too large a percentage of poor welds either because the time of the pulse or its size was too large, and therefore the weld was burnt, or because the time of the pulse or its size was too small, and therefore the weld was insufficiently made.

In an attempt to correct these inaccuracies and provide regulation for the weld that is dependent for its action upon the completion of the weld itself, several measuring circuits have been proposed. It is well known that as the weld is made, its resistance decreases until it is about one-tenth of its original value. If, therefore, a circuit were provided which would compare the original weld resistance with the smaller resistance upon completion of the weld, that circuit could interrupt the flow of the welding current and control the making of the weld. Control circuits in which the voltages across condensers or across inductances, representing initial and final weld resistances, are compared have, therefore, been proposed to terminate the single pulse welding current. However, to accomplish this large amounts of additional circuit elements and equipment are required.

It is an object of this invention to provide a method of welding small objects in which completion of the weld automatically terminates the heat supplied to the weld.

It is another object of this invention to provide a method of welding in which the initial voltage applied to the weld is sufficient to break down any value of initial contact resistance and permit the flow of an adequate heating current.

It is a further object of this invention to provide a method of welding in which an adequate flow rate of energy is applied to the weld which will not permit the energy flow or total energy in any instance to rise to a destructive level.

It is a still further object of this invention to provide a circuit for intermittent pulsation welding.

Intermittent pulsation welding is known as a resistance welding method wherein the flow of welding current or heat is applied repeatedly for the making of a single weld in parts clamped under pressure between electrodes at rest when a single like impulse of the same current is not sufficient to produce the desired weld. As such this process has been used with long pulses of several cycles duration, the duration of the cycle being only limited by the necessity of allowing time for the electrodes to cool between cycles and for heat to be dissipated from the surface of the objects being welded to prevent permanent surface deformation. It has been used on very heavy work pieces as a substitute for a continuous heavy duty single weld.

Intermittent pulsation welding is possible because the time between pulses, while of sufficient duration to allow a redistribution of heat in the surfaces and electrodes, is not long enough to allow the heat to leave the weld, so that when the next pulse is applied the energy is cumulative to the energy already there in the weld.

It has been found that by using pulses of the order of microseconds duration applied to small objects, the heat supplied will be cumulative although the period between the pulses is of relatively very long duration; it is believed that this is so because the time required to dissipate a given amount of energy is not dependent on that amount of energy but upon the time constant for the conduction of heat, which is dependent on the body itself, and the ambient temperature, etc. This being so, even these small amounts are not dissipated during the time between the microsecond pulses. Thus, with pulses of the order of microseconds duration, the period between the pulses may be of the order of 10 to 10,000 times the duration of the pulse.

We have also found that in order to have automatic termination of the weld the pulses, after completion of the weld, must drop to an energy level below which the cumulative effect will take place, so that heat will not build up to destroy or burn the weld.

In order to obtain these and other benefits, it has been found necessary to use pulses of the order of microseconds. We have found that if pulses of the order of milliseconds are used, the energy input for each pulse is too high. This is particularly true when the instant of completion of the weld is considered. In a pulse of say 30 milliseconds duration the weld may be completed, that is the resistance of the weld drops to its low value, during the initial part of that particular pulse, after perhaps 2 milliseconds. However, heat will continue to be supplied to the hot weld for 28 more milliseconds before the weld will have a chance to dissipate the heat and thus prevent any cumulative heating effect of these lower energy pulses. Thus, while the last 28 milliseconds of that pulse will supply energy at a lower rate than previously, the integrated total of heat supplied over such a relatively long time at 28 milliseconds may be sufficient to burn or destroy the weld. It is therefore necessary to have the pulses of such short duration that even if the weld is completed immediately upon the commencement of a new pulse, the additional energy supplied during that pulse will not be enough to destroy the weld. Succeeding pulses, after the weld is completed and the resistance thus reduced, cannot supply enough energy to maintain the melting temperature both because the resistance has dropped, and because the pulses are initially chosen by design to a duration suitable to this objective.

In accordance with one feature of this invention, energy is supplied to the weld in discrete spaced increments.

In accordance with another feature of this invention, the pulses of energy are of durations of the order of microseconds.

In accordance with still another feature of this invention, the duration of the period between pulses may be from the order of 10 times as long as the pulse to the order of thousands of times as long.

These and other features of the invention will be understood more fully from the following detailed description with reference to the accompanying drawing, in which.

Figure 1:
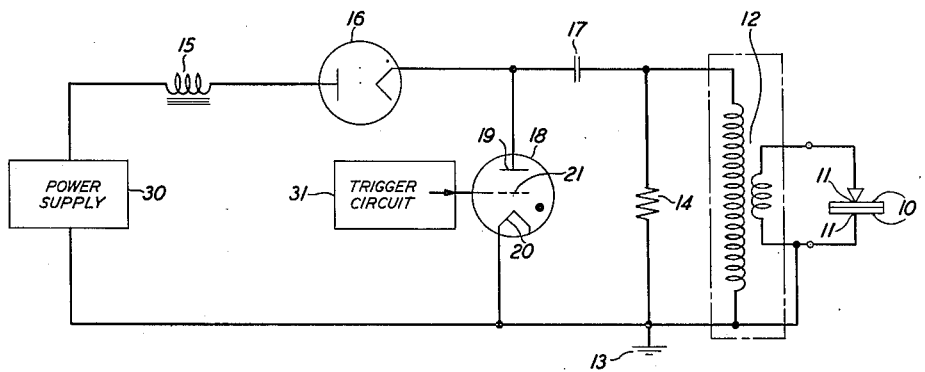
Fig. 1 shows one welding circuit illustrating this invention.

Referring now to the drawing, the objects 10 to be welded are placed under pressure between electrodes 11, which are connected to the high side of the pulse welding transformer 12, both sides of the transformer being grounded, as at 13. A shunt resistance 14 is across the primary of the transformer and may be adjusted to vary the energy supplied to the weld. The power supply 30, which may be a rectified direct current, is connected to the primary of the transformer 14 through a charging inductance 15, a charging diode 16, and a condenser 17. Although a condenser is shown in Fig. 1, it may be found preferable to use a line type network, such as is well known in the pulsing art, in order to obtain square wave pulses of energy. When a condenser is used, it is to be understood that the duration of the pulse as discussed in this specification refers to the duration of the equivalent square pulse and not to the time constant of the condenser discharge. The inductance 15 and capacitance 17 are resonant so that the voltage on the condenser 17 builds up to about twice the voltage of the power supply. The diode 16 prevents the condenser discharging back through the power supply.

A tube 18, which may be of the type known as a hydrogen thyratron, is connected across the primary of the transformer. The anode 19 of the tube is connected between the diode 16 and the condenser 17 while the cathode 20 of the tube is connected to the ground 13. The grid 21 is connected to a trigger circuit 31, which determines the repetition rate of the welding pulses. Such a trigger circuit, which may be a blocking oscillator circuit or a multi-vibrator circuit, is well known in the circuit art and in connection with the use of hydrogen thyratrons.

Figure 2:
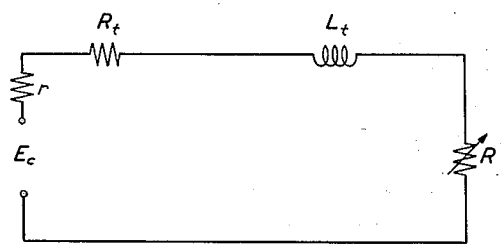
Fig. 2 is an equivalent circuit of a portion of Fig. 1.

Fig. 2 shows the equivalent circuit considering $E_c$ to be the pulse of condenser voltage applied to the primary of the transformer upon triggering of the tube 18, $r$ the circuit resistance, $R_t$ and $L_t$ the equivalent transformer resistance and inductance, and $R$ the weld resistance in terms of the primary. It is known that the variable resistance of the weld changes from $R$ initially to approximately $R/10$ at completion of the weld. However, because the current $I$ is determined not only by $R$, but also by $R_t$, $L_t$, and $r$, it does not increase proportionately. In circuits we have tested we have determined the increase to be approximately in the ratio of $\sqrt{2}$. The power thus supplied to the weld at the completion of the weld instead of being $I^2R$ is $(\sqrt{2}\,I)^2(R/10)$ or $(1/5)\,I^2R$. Without intermittent pulsation, this reduction of the energy supply alone would be insufficient to prevent further rise in the temperature of the weld.

The energy pulses are therefore so chosen that initially they will be of sufficient energy to heat the weld without one singly completing the weld, but that after the reduction of the weld resistance $R$ the energy content of each pulse is insufficient to allow an accumulation of heat in the weld.

We have also found that by limiting the pulse length to microseconds, the charge voltage may be increased without increasing the flow rate or the total energy supplied as a result. The stored energy discharged to the weld is represented by the relation $$\text{Energy} = \tfrac{1}{2}CE^2$$

Therefore, in order to increase the voltage it is necessary to decrease the value of $C$. This reduction produces a short pulse, which is desired for microsecond pulsing. In single pulse welding circuits, however, such a reduction of the condenser value causes too great an increase in the input rate of energy to the weld, which is destructive. We have found however, that because of the smaller amount of energy delivered by each pulse and because of the short pulses used, the value of the initial breakdown voltage on the weld may be increased.

In one welding operation carried out in accordance with our method and circuit as herein set forth and which is illustrative of the values to be used, pure silver contacts were welded to 22-mil silver wire. The condenser 17 was one-half a microfarad and was charged to approximately 6,000 volts, producing computed equivalent square wave pulses of 9-watt seconds energy content, triggered to a repetition rate of 50 pulses a second. The pulses were of equivalent 30 microseconds duration repeated once every 20,000 microseconds. The shunt resistance 14 was 100 ohms and the charging inductance 15 was 30 henries. The pieces were subjected to pressure at the electrodes of the magnitude normally employed in continuous welding operations for pieces of these sizes.

We have found it preferable that the frequency at which the LC circuit resonates be greater than one-half the repetition frequency of the trigger tube so that the condenser will have charged to its full value each time before the tube is triggered; this is also desirable as after the condenser has charged a stable condition is reached during which no current is flowing in the circuit, as the diode prevents continuation of the oscillation back through the power supply. In the circuit used with the above illustrative welding data, the frequency of repetition was 50 pulses per second while the frequency of resonance of the LC circuit was 41.1 cycles per second, which is greater than one-half the frequency of repetition.

In the operation of the welder during the making of these welds we found that although the metals were left in the welder after completion of the weld with the machine on, the continued application of the 9-watt second pulses did not even raise the temperature of the welded parts to a level detectable by the sense of touch. Thus, a proper weld is always assured by merely leaving the circuit on long enough to complete the weld. Conversely, however, because of the smallness of the work pieces and the short total periods of time involved, we also found that complete welds were made very quickly and expeditiously, so that an operator by merely putting the work pieces in place, turning the circuit on momentarily and then off, and taking the pieces out was assured finished welds.

It is to be understood that the above-described arrangements are illustrative of the application of the principles of the invention and that various modifications may be made therein without departing from the scope and spirit of this invention.

What is claimed is:

1. In resistance spot welding of small metal parts, the method of utilizing the drop in resistance in the weld to prevent burning of the weld, said method comprising subjecting said parts to a continuous welding pressure and to a plurality of pulses of welding current, each of said pulses being of insufficient energy singly to make the weld and said pulses being of a duration in the order of microseconds, whereby when the weld is made the drop in resistance of the weld prevents sufficient energy being further delivered to the weld to overheat it.

2. The method of resistance welding in accordance with claim 1 wherein the duration of said pulses and the periods between pulses are both of the order of microseconds.

3. The method of resistance welding in accordance with claim 1 wherein said pulses and the periods between said pulses are both of the order of microseconds and said periods are of considerably longer duration than said pulses.

4. In resistance welding of small metal parts, the method of utilizing the drop in resistance in the weld on completion to prevent burning of the weld, said method comprising subjecting said parts to a continuous welding pressure and to an intermittent pulsating current, each of said pulsations being of insufficient energy to singly make the weld and being of a duration in the order of 30 microseconds.

5. The method of resistance welding in accordance with claim 4 wherein the periods between said pulsations are large with respect to the duration of said pulsations.

ANDREW D. HASLEY.
FRANK H. HIBBARD.

REFERENCES CITED

The following references are of record in the file of this patent:

UNITED STATES PATENTS

| Number | Name | Date |
|---|---|---|
| 2,046,969 | Redmond | July 7, 1936 |
| 2,372,147 | White et al. | Mar. 20, 1945 |